(12) United States Patent
Borkovec et al.

(10) Patent No.: US 8,140,416 B2
(45) Date of Patent: Mar. 20, 2012

(54) ALGORITHMIC TRADING SYSTEM AND METHOD

(75) Inventors: Milan Borkovec, Boston, MA (US); Hans Heidle, Quincy, MA (US); Robert Sinclair, Merrick, NY (US)

(73) Assignee: ITG Software Solutions, Inc., Culver City, CA (US)

( * ) Notice: Subject to any disclaimer, the term of this patent is extended or adjusted under 35 U.S.C. 154(b) by 795 days.

(21) Appl. No.: 11/812,359

(22) Filed: Jun. 18, 2007

(65) Prior Publication Data

US 2007/0294162 A1     Dec. 20, 2007

Related U.S. Application Data

(60) Provisional application No. 60/814,066, filed on Jun. 16, 2006, provisional application No. 60/944,131, filed on Jun. 15, 2007.

(51) Int. Cl.
*G06Q 40/10* (2006.01)
(52) U.S. Cl. ............................................. 705/35; 705/37
(58) Field of Classification Search .................... 705/35, 705/37
See application file for complete search history.

(56) References Cited

U.S. PATENT DOCUMENTS

| | | |
|---|---|---|
| 2003/0009411 A1 | 1/2003 | Ram et al. |
| 2003/0093343 A1* | 5/2003 | Huttenlocher et al. ......... 705/35 |
| 2003/0101121 A1 | 5/2003 | Spampinato et al. |
| 2003/0172021 A1 | 9/2003 | Huang |
| 2004/0143538 A1* | 7/2004 | Korhammer et al. ........... 705/37 |
| 2005/0240510 A1* | 10/2005 | Schweickert et al. .......... 705/37 |
| 2006/0026090 A1 | 2/2006 | Balabon |

FOREIGN PATENT DOCUMENTS

| | | |
|---|---|---|
| WO | 9745814 A | 12/1997 |
| WO | 0031699 A | 6/2000 |

OTHER PUBLICATIONS

Rongfang Liu, The Future of Transportation Planning: Dynamic Travel Behavior Analyses Based on Stochastic Decision-Making Styles, Aug. 2003, http://transportation.njit.edu/nctip/final_report/FutureOfTransportationPlanning.pdf.*
No Author, "Ask Dr. Math"—Math Help Forum @ Drexel University, Dec. 2005. http://mathforum.org/library/drmath/view/68384.html.*
Laura A. Tuttle "Information Flow in a Fragmented Dealer Market: Three Essays on Price Discover," (Dissertation, Ohio State University, 2004) (pp. 1-123).*
Extended European Search Report issued in EP07796218.1, dated Jun. 20, 2011, 16 pages.
International Search Report issued on Dec. 17, 2007 in application No. PCT/US07/14175, 9 pages.

* cited by examiner

*Primary Examiner* — Elizabeth Rosen
*Assistant Examiner* — Abdul Basit
(74) *Attorney, Agent, or Firm* — Rothwell, Figg, Ernst & Manbeck, P.C.

(57) ABSTRACT

A system and method for allowing market participants to evaluate the likelihood of finding hidden volume. The model can predict hidden volume and assess the probability that a market order will be executed within the spread and better than the mid-quote. The cost per immediate execution can be assessed.

14 Claims, 12 Drawing Sheets

ALGORITHMIC TRADING SYSTEM AND METHOD

CROSS-REFERENCE TO RELATED APPLICATIONS

This application claims the benefit of U.S. Provisional Application Ser. No. 60/814,066, filed Jun. 16, 2006, entitled "ALGORITHMIC TRADING SYSTEM AND METHOD," and of U.S. Provisional Application Ser. No. 60/944,131, filed Jun. 15, 2007, entitled "SYSTEM AND METHOD FOR DETERMINING THE LOCATION AND SIZE OF UNDISCLOSED LIMIT ORDER VOLUME," the contents of each of which are incorporated herein by reference.

BACKGROUND OF THE INVENTION

1. Field of the Invention

The present invention relates generally to systems and methods for identifying liquidity. In particular, the present application relates to systems and methods for determining the presence of hidden limit orders in an order book.

2. Description of the Related Art

There is a demand among financial traders for more transparency and currency of market information in order driven electronic markets, such as the new level 2 and real-time data products offered by NASDAQ and NYSE. Markets which provide electronic limit order books, including, for example, Euronext, London Stock Exchange, XETRA, Spanish Stock Exchange, and Toronto Stock Exchange, provide a measure of currency and transparency. An electronic limit order market is a trading platform where anonymous buyers and sellers post price-quantity pairs—i.e., the quoted bid (or ask) prices and associated quantities (depths) of a stock that the market participant is willing to buy (or sell). Limit order books offer market participants the ability to observe levels of market liquidity by displaying prices and quantities of unexecuted limit orders. Utilizing this data, market participants can implement a range of "game theoretical" strategies and choose limit orders with specified price, quantity, and timing, thus allowing them to minimize execution costs and uncertainty, hide market information, and possibly move the market towards the desired price.

Given concerns associated with information leakage due to order placements, some market venues allow market participants to enter "hidden" limit orders which do not reveal the full share volume size and/or the associated price level (also known as "iceberg", "undisclosed", or "discretionary" limit orders). This brings with it a complex interrelationship between exposure risk (adverse selection), market liquidity, and the need for transparency. From a market design point of view, hidden limit orders represent a trade-off between liquidity and transparency. Trading systems need to attract liquidity and trading activity. The availability of hidden limit orders encourages limit order traders, who are otherwise hesitant to fully disclose their trading interests, to supply liquidity—thus increasing the liquidity on the system. However, hidden limit orders volume, by its nature, does not add information to the market and thus, does not help in the market's transparency.

In particular, hidden orders inside the spread will not attract activity to a venue, since most order routing systems can only operate on visible (i.e., displayed) information. Thus, as reported by ANANTH MADHAVAN, "Market microstructure: a survey", *Journal of Financial Markets*, 3 (2000), pp. 205-258, hidden limit orders clearly diminish supposed benefits of transparent order driven markets: price efficiency, low costs of market monitoring and less information asymmetries.

The concept of hiding transaction fingerprints has been around for several years, but has recently seen increased popularity due to the advent of algorithmic trading systems such as ITG's "Dark Server" or CSFB's "Guerilla," which utilize continuous mid-point crosses from "Dark Books." For illiquid stocks, which have larger intra-day volatility, the concept of hiding allows the market participant to transact with minimum market impact.

Hidden limit orders have become an important limit order type. As disclosed in Hasbrouck and Saar [2002], hidden orders account for more than 12% of all orders executed on Island, and Tuttle [2002] reports that hidden liquidity represents 20% of the inside depth in the Nasdaq 100 stocks. D'Hondt, De Winne, and Francois-Heude [2004] disclose that hidden depth on Euronext Paris accounts for 45% of the total depth available at the best five quotes and 55% of the total depth at the best limits.

These findings suggest that there are underlying factors that cause a market participant to use a hidden versus a visible limit order, considering the controversial rationale behind using hidden limit orders. Consistent with previous literature, there are two main beliefs for the existence of hidden limit orders. First, hidden limit orders can be used by large liquidity traders to reduce their exposure risk by hiding their intent to trade. In other words, liquidity traders use hidden limit orders as a self-protective strategy against other more informed traders. Second, hidden limit orders can be mostly submitted by informed traders to conceal their insider information. By placing (aggressive) hidden limit orders, market participants with insider information can trade quickly and almost unobserved. Therefore, informed traders may prefer using undisclosed versus displayed limit orders for certain market conditions.

Taking into account undisclosed limit orders can dramatically change the picture of the limit order book at any given time of the day. For example, referring to FIG. 1, it can be easily concluded that if instantaneous execution of a buy market order for 1,000 shares of company Argonaut Group Inc. is desired, the cost associated with that trade (benchmarked on the existing mid-quote) would be $0.05 per share. This cost is computed by first assuming that only the observable volume is available and then climbing up the book to pay the following average execution price x:

$$x = \frac{500 \times 35.05 + 300 \times 35.07 + (1000 - (500 + 300)) \times 35.12}{1000},$$
$$= 35.06537$$

giving a cost per share y of:

$$y = 35.07 - \text{mid quote}.$$
$$= 35.07 - 35.02 = 0.05$$

However, if the order book could be reconstructed in a way that included the inferred hidden shares using information from prevailing market conditions, one would then see that the "true" cost for the 1,000 shares is actually only about $0.045 per share:

$$x = \frac{\begin{array}{c}3\times 35 + 2\times 35.01 + 5\times 35.02 + 6\times 35.03 + 543\times\\ 35.05 + 300\times 35.07 + 141\times 35.12\end{array}}{1000}.$$
$$= 35.06537$$

Thus, the cost per share y after hidden volume is considered is:

$$y = 35.06537 - \text{mid quote}$$
$$= 35.06537 - 35.02 = 0.04537$$

A trader seeing the "true" limit order book instead of FIG. 1 might be willing to consider the opportunity cost relative to the market dynamics associated with removing only a portion of the desired volume from within the spread—which leads to improvement in per share transaction cost. As reported by Pascual and Veredas [2004], the explanatory power of the book is concentrated within the dynamics associated with the visible best quotes. This trader would also be able to evaluate the probability that an order is filled within or below the existing visible best ask price.

Thus, there remains a need for a system that can estimate hidden limit orders and provide a probabilistic "reconstructed" order book including inferred hidden limit orders that allow the trader to factor this information into a trading position.

SUMMARY OF THE INVENTION

According to an embodiment of the present invention, a system and method are provided for identifying hidden liquidity. Systems and methods are provided that determine the probability of the existence of hidden liquidity, including a calculation of the volume of the hidden liquidity between the best bid and ask, and a prediction of the actual location (price) of the hidden volume. With this information, a complete limit order book may be constructed and displayed that includes the expected hidden volume at the appropriate price levels.

According to embodiments of the present invention, systems and methods are provided for inferring the presence of hidden limit orders in an order book based on historical order data. For example, lever 2 messages can be examined within a predetermined time frame to identify cancellation or modification order messages that correspond in price, size and exchange to a particular trade. If a trade cannot be matched to a limit order message, the trade is classified as a hidden trade.

According to embodiments of the present invention, a model can be constructed that predicts the volume and price ("location") of hidden liquidity for trading forums and/or for tradable assets (e.g., a security). The model is constructed from historical order information, which is used to infer hidden order volume and location from displayed order and execution data. The model can consist of a number of coefficients associating hidden volume and/or location for each tradable asset with market conditions. Accordingly, the coefficients can be used to estimate current hidden liquidity for a tradable assets based upon current market conditions.

Models can be built from an examination of historical data and then applied to current data to predict the existence of hidden orders (e.g., non-displayed limit orders) within a trade forum. An order book can be reconstructed that comprises both displayed and hidden order data.

According to embodiments of the present invention, hidden liquidity is estimated based on historical data, such as, 21-day median trade share volume.

Further applications and advantages of various embodiments of the present invention are discussed below with reference to the drawing figures.

DETAILED DESCRIPTION OF THE PREFERRED EMBODIMENTS

Figure 1:
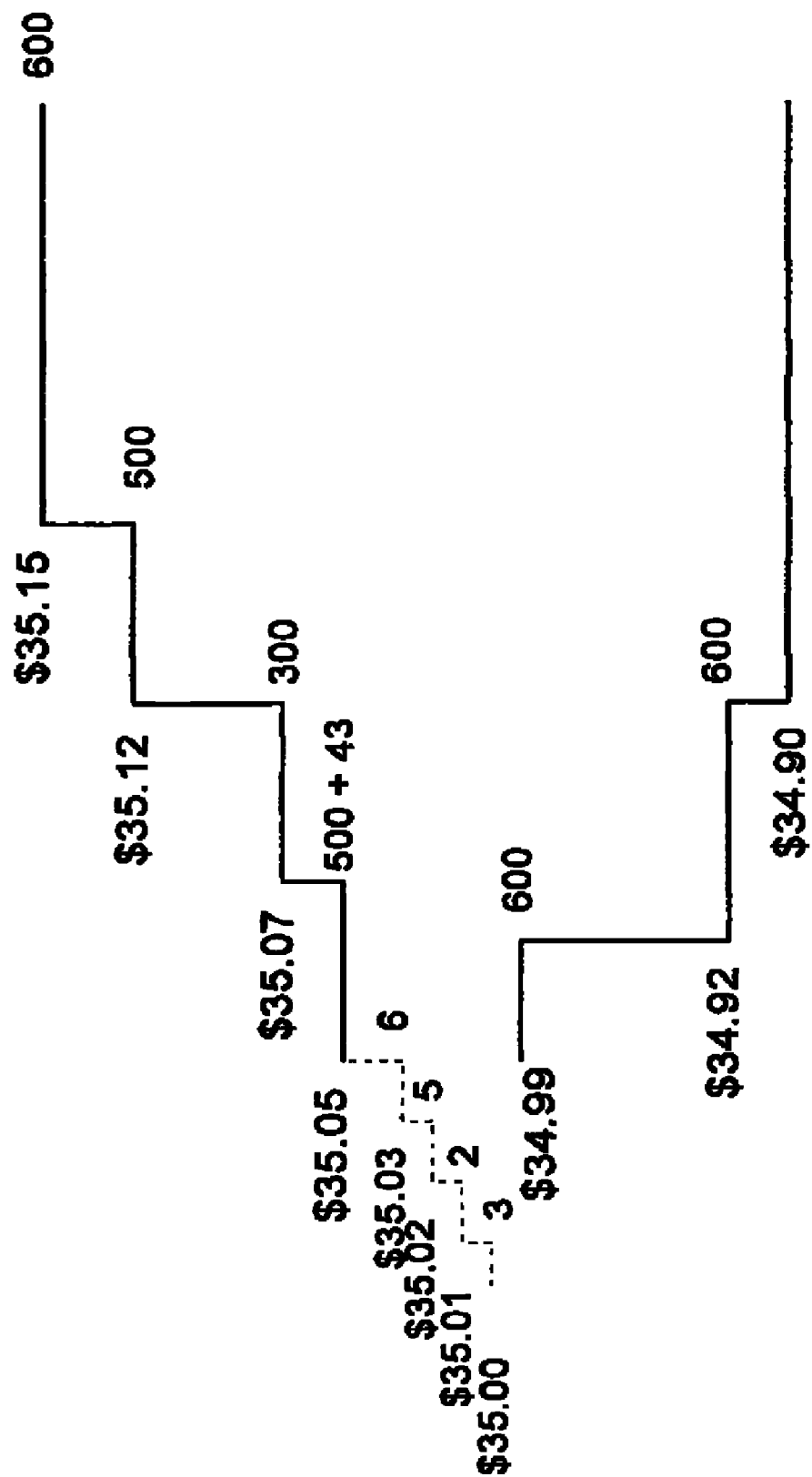
FIG. 1 is a graphic depiction of a limit order book for an exemplary stock.

While the present invention may be embodied in many different forms, a number of illustrative embodiments are described herein with the understanding that the present disclosure is to be considered as providing examples of the principles of the invention and such examples are not intended to limit the invention to the embodiments shown or described herein.

According to one aspect of the invention, reconstruction of a limit order book around the best levels allows measurement of the "true" execution prices if market orders or marketable limit orders are placed. The possibility of getting better than expected execution prices has two main implications:

quantifying best execution (ignoring execution improvement can be misleading when comparing execution quality across markets with significant non-displayed additional liquidity); and undisclosed (e.g., "hidden" or non-displayed) volume is an integral part of the pricing process. It will be seen that price improvement is largest when spreads are narrow and volatility is large. Trader behavior is better understood relative to additional information in the limit order book. The findings are of great interest not only in terms of modeling pure order driven markets and characterizing traders' behavior, but also in giving an advantage as it relates to implementing an automatic search (liquidity and asymmetric information) algorithm. For more on some basic questions of pre-trade transparency and the challenges faced when developing better trading algorithms and improving trading performance see Borkovec and Yang [2005], Domowitz and Yegerman [2005a], Yang and Jiu [2006], and Domowitz and Yegerman [2005b]. Madhavan [2000, page 234] defines pre-trade transparency as "the wide dissemination of current bid and ask quotations, depths, and possibly also information such as the existence of large order imbalance."

Aspects of preferred embodiments of the present invention are described as follows. The data are described in the section entitled "Data." Static empirical evidence associated with hidden volume and its placement is described in the section entitled "Model." Construction of a limit order book with inferred hidden limit orders and applications are discussed in the section entitled "Applications."

Data

The following explanation of the data includes a description of data used by the inventors in developing aspects of the present invention. The data is exemplary in nature and the invention is not limited to the specific data described. One skilled in the art will readily understand from the following discussion how to make or use the present invention.

Research data included three months of Comstock level 2 (L2) real time information from ARCA (note that other suitable data sources are available, such as, for example, INET direct exchange Level 2 data). Two months of data from June to July 2005 were used to estimate the empirical models. August 2005 data were used for out-of-sample testing.

Data feeds are made up of a series of sequenced messages that describe orders added to, removed from and executed on the corresponding exchange. In general, an "add order message" indicates that a new order has been accepted by the system and added to the displayed limit order book. The "modify order message" references a previously submitted order that has been partially executed (number of shares always reduced). A "cancel order message" is sent whenever an order on the book is cancelled; in the case of an Archipelago feed, this message means cancelled or executed. Messages from INET include an "execution message," which is sent whenever an order on the book is executed in whole or in part, and a "trade message," which provides information about execution events that involve orders not visible on the INET book.

In the case of an Archipelago feed, Level 1 trade messages must be matched with modify and cancel order messages to determine (1) which orders have been executed or actually cancelled, and (2) which trades have been executed through undisclosed limit orders. To match trades with limit orders, L2 messages can be examined within a 2-second time bandwidth to find the order cancellation or modification message which corresponds in price, size, and exchange to a particular trade. If a trade is matched to an order message, the side classification of this trade is obtained from the message; such trades would be classified as being visible.

If there is more than one match, it is assumed that the correct match is the one which is closest in absolute time difference between the time stamp and the message time. If a trade cannot be matched with a limit order message, then the trade can be classified as a hidden trade (i.e., coming from a hidden/undisclosed limit order). To determine the side of the hidden trade, a generalization of the algorithm disclosed in CHARLES LEE AND MARK READY, "Inferring Trade Direction from Intraday Data", *The Journal of Finance*, 46(2) (1991), pp. 733-746, the contents of which are hereby incorporated by reference, can be used. The level of reliability for the side classification algorithm was found to be 90-95% accurate when tested against execution data where the side is known.

Table 1 below contains a summary of exemplary trading data based on data from Comstock's ARCA data feed on 329 tickers from June-August 2005. Table 1 discloses the tickers used in the model, based on market capitalization. More than 78% of the tickers chosen belong to small cap stocks, 13% belong to median cap stocks, and the remaining 9% belong to large cap stocks. A stock is defined as being small cap if its market capitalization is less than $1.5 billion. If the market capitalization is greater than $1.5 billion but less than $10 billion, it is considered as a median cap stock. All other stocks are classified as large cap stocks.

For each large cap stock, the average number of trades per day as shown is 7,900 with an average trade size of 920 shares. The average number of trades per day for each small cap stock is approximately 280 trades with an average trade size of 520 shares. Of the trading activities for the small cap stocks, 28% of all traded volume is classified as hidden, while the number is only 21% for the large cap stocks. Approximately 96% of all orders added to the book are eventually cancelled. Of the cancelled orders, approximately 10% can be classified as fleeting orders (i.e., defined as an order which is added and cancelled from the book within 2 seconds or less). Order time stamps are generally in 1-second increments.

The data also show that, on average, hidden orders have a larger size in comparison to orders that are fully displayed. This result is consistent with Harris' [1996] findings that traders often restrict displayed orders, especially for orders with larger expected remainders.

TABLE 1

| CHARACTERISTIC (DAILY AVERAGE) | LARGE CAP STOCKS (CAP > $10 BILLION) | MID CAP STOCKS ($10 BILLION < CAP < $1.5 BILLION) | SMALL CAP STOCKS (CAP < $1.5 BILLION) |
|---|---|---|---|
| TRADES: | | | |
| Number of Trades | 207,000 | 87,800 | 72,000 |
| Size of Trade (Visible) | 370 | 300 | 200 |
| Size of Trade (Hidden) | 550 | 450 | 320 |
| Percentage of Trade Hidden | 21% | 23% | 28% |
| FLEETING/CANCELLATION: | | | |
| Number of Fleeting Orders | 328,500 | 126,800 | 160,100 |
| Fleeting Orders/Total Cancelled Orders | 11% | 9% | 13% |
| Cancelled Orders/Total Added Orders | 96% | 96% | 97% |
| Number of Stocks | 26 | 43 | 260 |

Given that the model is trade-based in nature, classifying stocks by market capitalization is inadequate since stocks within the same market cap group can differ significantly in trade volumes. Therefore, instead of the commonly used market capitalization, stocks can be grouped based on their 21-day median trade share volume. As a result, stocks can be classified with similar trade volume within the same group.

To get a representative sample of tickers across the universe, all available tickers (approximately 7,000) can be ranked according to their 21-days median trade volume at the beginning of the sample period. Then, this universe can be divided into eleven liquidity groups with Liquidity Group 0 representing the least liquid stocks and Liquidity Group 10 representing the most liquid stocks. For each of the eleven liquidity groups, a randomly selected sample of tickers is used in the pooled data model. Loosely speaking, micro cap stocks belong to Liquidity Groups 0 to Liquidity Group 4, small cap stocks belong to Liquidity Group 4 to Liquidity Group 7, mid cap stocks belong to Liquidity Group 8 to Liquidity Group 9, and large cap stocks belong to Liquidity Group 10.

This grouping is justified by examination of order placement in each liquidity group showing that there is a clear difference in how limit orders are placed across different liquidity groups. Limit order placement can be classified into three categories: (1) AT, which represents limit orders being placed at the best level, (2) BETTER, which represents limit orders being placed between best bid and ask, and (3) AWAY, which represents orders being placed at prices worse than the best levels.

Figure 2:
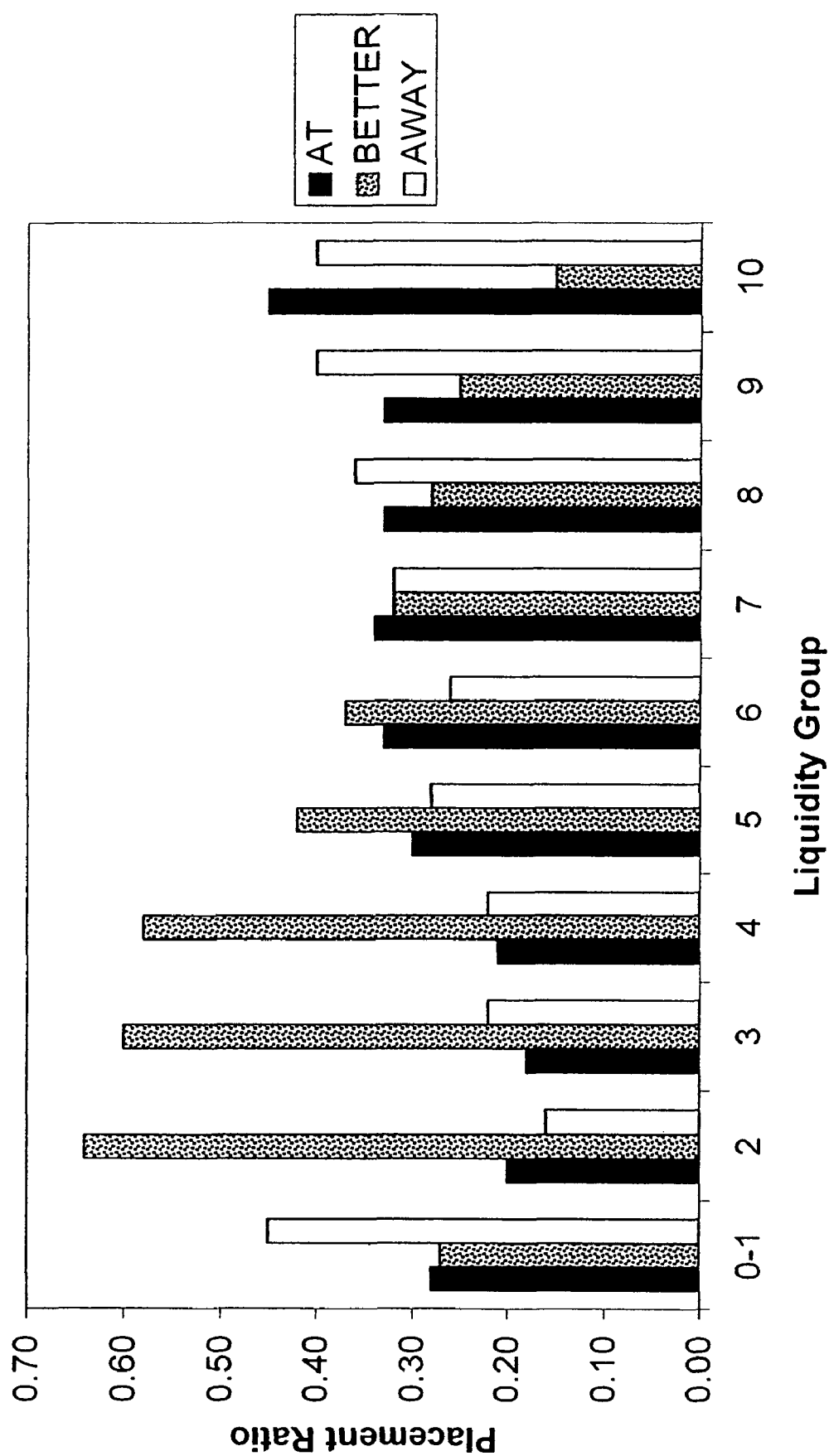
FIG. 2 is a graph depicting exemplary hidden order volume model coefficient and parameter estimates by liquidity group.

From FIG. 2 it can be seen that the placement pattern is not similar across any liquidity group. For the lowest liquidity group, more than 28% of all new limit orders were placed AT the best bid and ask level while for the most liquid group, 48% of all new limit orders were placed AT the best bid and ask level. The difference in percentage reflects the differences in share trade volume, urgency to get order completed, and the competition within the liquidity group.

In this pooled data analysis, specific factors that appear to affect the probability of hidden order placement are identified. One intuitive hypothesis is that hidden orders are more frequently used for stocks with a high exposure risk (Harris [1997]).

In a market with low volatility, hidden orders may reduce the chances of being front-run and thus volatility may play an active role in an analysis. In a market that enforces time precedence, front-running can be very expensive.

Since front-running is expected to be more expensive for stocks with relatively low prices, the use of hidden orders is expected to be higher for those stocks. As for uninformed traders, the option value of limit orders is affected by factors like volatility (Mid-Quote Volatility), trading activity (Depth Size, Time Since Last Trade, and Spread) and time to total (partial) execution. Order exposure risk may also be related to the expected time for an order to be (totally) executed and the frequency of orders that are partially displayed is related to the trading frequency of a stock.

Time of the day is another important variable, as there may be privileged periods over the trading day to enter hidden orders on the market. Market participants may place limit orders at specific periods of the day. The model could be extended to capture the anomalies associated with days of the week and month of the year. The model could also be extended to take care of timing associated with rebalancing portfolios. The trading day can be divided into thirteen 30-minute time bins and the order placement pattern examined.

Figure 3:
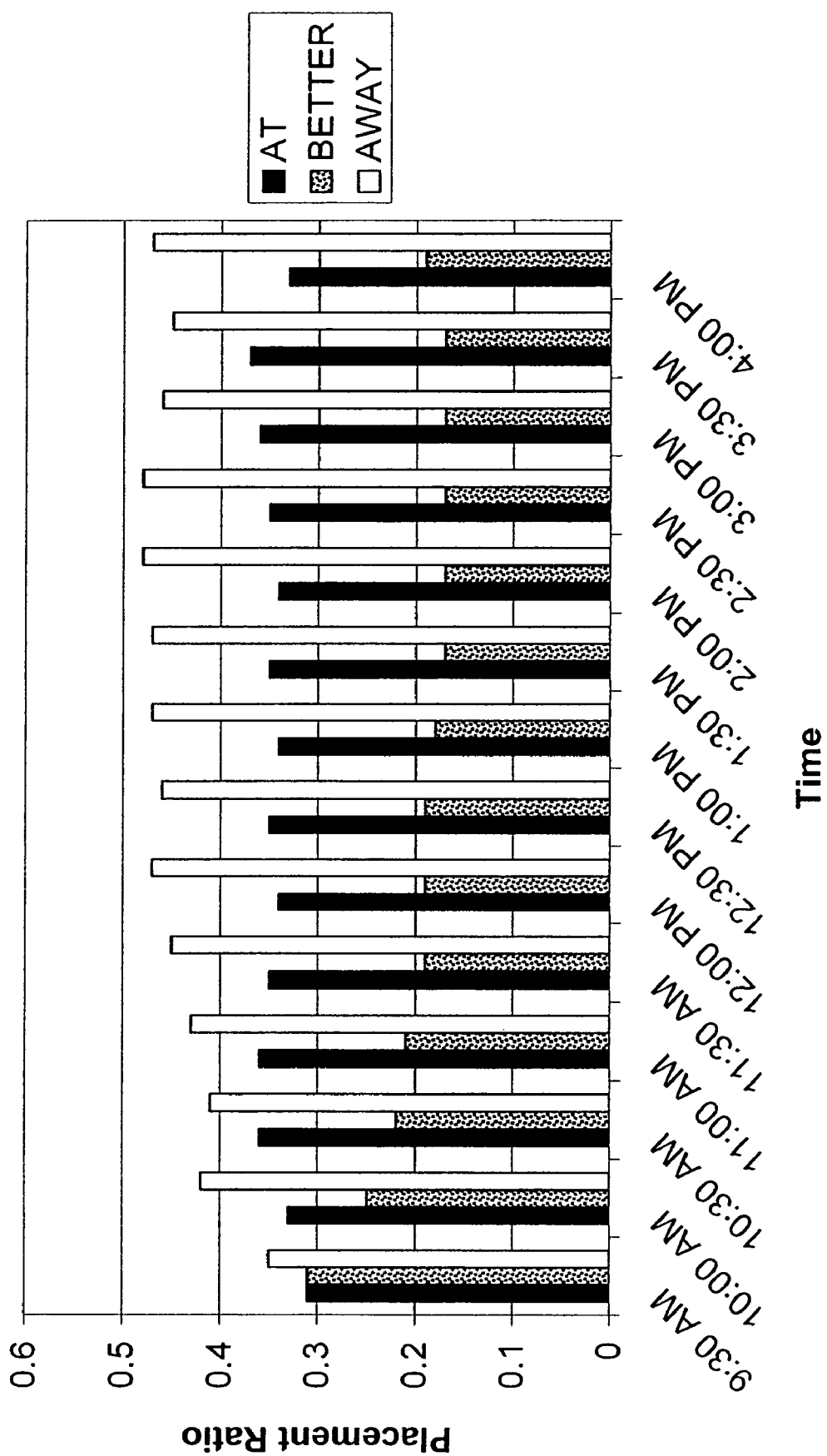
FIG. 3 is a graph depicting exemplary hidden order location model coefficient and parameter estimates by liquidity group.

As shown in FIG. 3, time of day seems to explain where an order might be placed. At the opening of the market, with no real information, a market participant might be equally likely (33%) to place a limit order BETTER, AT, or AWAY. As the day progresses, for example, by 3:30-4:00 pm, the probability that a market participant will place a limit order within the best bid and ask drops to 18%. The average number of limit orders per ticker placed throughout the day shows that most limit orders are placed at the first 2.5 hours of the trading day. This pattern is consistent across all liquidity groups.

When the pattern associated with the number of the orders placed based on the time period of the day is examined, one will note that it seems to mimic the spread curve. This suggests that time bin might not be a factor associated with limit order placement and that what is observed is really limit order placement relative to the spread. The spread also captures the market impatience and is possibly the first hint that there might be asymmetric information among the market players. Glosten [1987], Glosten and Harris [1988], George, Kaul, and Nimalendran [1991], Brockman and Chung [1999] consider decomposition of bid-ask spread.

Glosten and Milgrom [1985] is among the many papers that identify that information asymmetries among investors influence the bid-ask spread. Large spreads would seem to suggest that there is little or no market information or activity. If the commonly known spread profile is examined, the spread is, on average, the largest at the opening of the market (the information searching period) and, as the day progresses and information is captured through the market transactions, the spread declines and reaches its lowest level by the end of the trading day.

A hidden volume predictor may take all the previously discussed variables or a subset into consideration. Some of these variables describe the stock price dynamics, while others describe the "fundamental" or historical characteristics of the stock. The next section discusses in more detail the model and its associated input variables.

Dynamic variables can include "Spread," which captures the level of trade interest and can hint that there may be asymmetric information among the market players; "Mid-Quote Volatility," where high volatility reflects the market uncertainty and the possibility of hidden volume being executed away from the mid-quote; "Average 1st Level Depth (by side)," which provides a first idea about available liquidity inside the spread and possible market asymmetry; "Order Placements/Cancellations," which signifies the intensity of information arrival to the market; "Lagged Hidden Volume," in which the state of the trading world is related to what was previously observed and the level of dependency is related to the time that has elapsed since the last observed activity; and "Misalignment of the exchange mid-quote relative to the composity mid-quote," where market participants react to disequilibrium in the market price. Dynamic variables can be standardized in order to (1) remove the time of day effect, (2) better measure extreme events, and (3) allow cross-sectional analysis.

Model.

A. Size of Undisclosed Limit Order Volume.

In this section, the model is described along with empirical results associated with estimating the size of the hidden volume and its location (placement) between the spread are examined. To achieve this goal, all trades that have been executed through undisclosed limit orders and their associated market conditions are identified. Because modeling the discrete choice of placing a hidden versus a visible limit order is desired, a probability regression model that maps trade volume with market conditions is used.

Different trading horizons (trading instantaneously, or within a 1-, 2-, 3-, 4-, or 5-minute period) can be used. A regression model that only uses the hidden trade volume that is actually executed would produce estimators which are biased downward. To correct that aspect, necessary censoring conditions are specified.

The model was evaluated and stylized facts were identified by (1) examining the prior belief and matching it with the empirical results to determine whether these results are consistent across all liquidity groups and (2) estimating McFadden's LRI to approximate a pseudo $R^2$ for assessing the goodness of fit.

Figure 11:
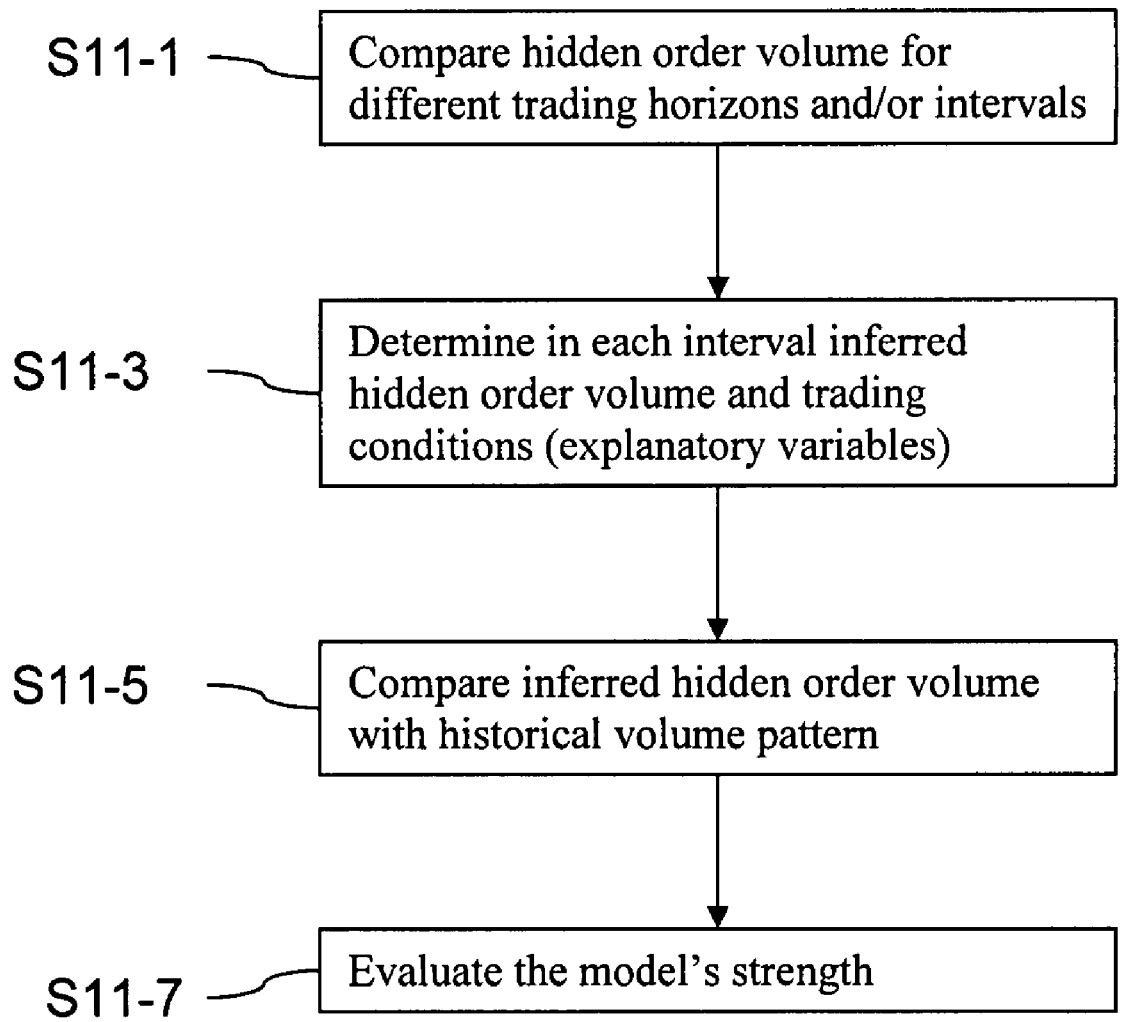
FIG. 11 is a flow chart depicting a method to develop and evaluate a model of hidden order volume according to an embodiment of the present invention.

With reference to FIG. 11, a method for evaluating a model for identifying hidden order volume may include a step of comparing hidden order volume for different trading horizons and/or intervals S11-1. Such intervals may be, for example, 1-, 2-, 3-, 4-, or 5-minute periods or instantaneous. Then, for each interval, inferred hidden order volume and trading conditions (explanatory variables) are determined in step S11-3. The inferred hidden order volume in compared with a historical volume pattern in step S11-5. The model's strength is then evaluated in step S11-7. The evaluation step may include examining the prior belief and matching it with the empirical results to see if the results are consistent across liquidity groups. The evaluation step may also include determining the $R^2$ for assessing the goodness of fit.

Some stylized facts relate to modeling hidden volume. For example, the effective spread and volatility measures capture the level of front-running and any abnormal market movement which could be associated with asymmetric information, "herding," market corrections, or short-term movements. Less than normal effective spread indicates that many market participants are front-running and hence, to camouflage some of the liquidity demand, the hidden volume would be greater. As for volatility, high volatility reflects the market uncertainty and the possibility of hidden volume being executed away from the mid-quote. With high volatility levels, a market participant is expected to place more hidden volume, since the probability for being executed increases and no information or strategy is revealed to the market. A larger absolute (daily spread) for a stock is associated with more hidden order volume. Liquidity providers might hide more hidden volume for stocks that have larger spreads because the likelihood of being front-run increases. When more limit orders are place, more hidden order volume is expected as market participants are more actively involved in the market and gaming for asymmetric information.

Table 2 below shows a subset of the variables used in the model for predicting hidden sell limit order volume. The numbers in parentheses are the standard errors for the parameters. As shown in Table 2, the coefficients associated with effective spread are negative and the coefficients associated with volatility are positive.

TABLE 2

| Liquidity | Goodness of Fit $R^2$ | Lagged Hidden Volume | Mid-Quote −1 | Mid-Quote 0 | Addition less Cancellation | Standardized Addition between and at the best Bid and Ask | Mid-Quote Volatility | Effective Spread |
|---|---|---|---|---|---|---|---|---|
| 0-2 | 0.05 | 0.1807 (0.0151) | −2.9563 (0.2336) | −1.2840 (0.1650) | 0.2043 (0.0523) | 0.2155 (0.0588) | $0.0205^{ns}$ (0.0763) | $-0.0064^{ns}$ (0.0783) |
| 3 | 0.05 | 0.1233 (0.0112) | −0.9911 (0.1329) | −2.9905 (0.1888) | 0.4151 (0.0386) | 0.2096 (0.0425) | 0.1557 (0.0541) | −0.1923 (0.0553) |
| 4 | 0.07 | 0.1072 (0.0077) | −0.9270 (0.0585) | −0.3364 (0.0427) | 0.1302 (0.0113) | 0.1057 (0.0116) | 0.1059 (0.0172) | −0.0477 (0.0150) |
| 5 | 0.08 | 0.1746 (0.0063) | −0.5122 (0.0316) | −0.2447 (0.0063) | 0.0857 (0.0055) | 0.0464 (0.0055) | 0.0420 (0.0076) | −0.0613 (0.0060) |
| 6 | 0.08 | 0.2037 (0.0043) | −0.2909 (0.0171) | −0.0985 (0.0120) | 0.0696 (0.0029) | 0.0429 (0.0030) | 0.0424 (0.0019) | −0.0323 (0.0030) |
| 7 | 0.08 | 0.1387 (0.0047) | −0.2429 (0.0144) | −0.1146 (0.0098) | 0.0350 (0.0022) | 0.0326 (0.0023) | 0.0328 (0.0013) | −0.0236 (0.0021) |
| 8 | 0.08 | 0.1633 (0.0039) | −0.1931 (0.0134) | −0.0872 (0.0091) | 0.0235 (0.0015) | 0.0294 (0.0016) | 0.0179 (0.0022) | −0.0172 (0.0013) |
| 9-10 | 0.06 | 0.3164 (0.0033) | −0.0868 (0.0097) | −0.0145 (0.0057) | 0.0119 (0.0008) | 0.0128 (0.0010) | 0.0091 (0.0012) | −0.0070 (0.0006) |

For the variable MID-QUOTE, a 1 is assigned if ARCA's mid-quote is greater than that of the composite mid-quote, a 0 is assigned if the mid-quote is equal, and a −1 is assigned otherwise. The coefficient values with the superscript ns indicate that these numbers are not significant at the 95% confidence level. Variables are standardized by their corresponding historical 3 month means and standard deviations, i.e.

$$X_{(standard)} = \frac{x - \bar{x}}{\sigma(x)}$$

where $\bar{x}$ is the mean and $\sigma(x)$ is the standard deviation of x.

Market participants can monitor the changes in the shape of the limit order book and track order additions, cancellations, depth, previous 15-seconds mid-quote returns, and the misalignment of the mid-quote associated relative to the composite market. These variables act as the frontline variables to capturing market dynamics and participants' gaming/strategy. The results suggest that more additions than cancellations of limit orders is a signal that there are players in the market that hope that such actions stimulate the market, perhaps to attract the market towards their undisclosed volume.

When the mid-quote is misaligned and the ECN's mid-quote is less than the composite mid-quote price, the expected buy hidden limit order volume will be less than that of an ECN which has a mid-quote that is equal or even greater that the composite mid-quote price (exemplary ECNs include Archipelago, INET, and Brut). In other words, it has been determined that hidden buy (sell) limit order volume follows the ECN with the highest (lowest) mid-quote price.

Apart from these variables, the previous hidden volume executed is examined. At first glance, one might dismiss this variable as being invisible and hence not a reliable explanatory variable, but this would be mixing the concept of hidden with that of invisible. After an execution against hidden volume takes place, there is a telltale trade tick which is printed. Research indicates that if hidden volume is found, there is a good chance that there will be more hidden volume—that is, Lagged Hidden Volume.

Certain stylized facts may be discerned. For example, when only absolute (daily) spread is considered, larger absolute spread for a stock indicates greater hidden order volume. Liquidity providers might hide more hidden volume for stocks that have larger spreads because the likelihood of being front-run increases. When considering only limit order placements, when more limit orders are placed, more hidden order volume is expected as market participants are more actively involved in the market and gaming for asymmetric information.

B. Location of Undisclosed Limit Order Volume

In the previous section, the size of hidden volume that is assumed to be located between the best bid and ask was modeled. In this section, it is described how the location of this volume between the best bid and ask can be estimated according to an embodiment of the present invention. To achieve this goal, the spread can be divided into uniformly spaced regions and the explanatory variables are used to estimate the probability that an order is placed in that region.

The premise is that market participants observe the market conditions and from that, decide where to place hidden volume. Hence, changes in the state of the limit order book cause participants to reevaluate their placement strategies. It is assumed that the "fundamental" factors, absolute historical (e.g. intra-day) spread (in cents), and volatility contribute to identifying where hidden orders are being placed on the book. The assumption is that placement is based on perceived market conditions such as absolute spread and volatility. The model maps the location of a hidden order with existing market conditions.

Table 3 discloses a subset of the variables used in the model for predicting the location of sell limit order volume according to an aspect of the present invention. Table 3 gives a brief relationship between a few market variables and the placement of hidden volume.

TABLE 3

| Liquidity | Goodness of Fit $R^2$ | Standardized | | |
|---|---|---|---|---|
| | | Return in last 15-seconds | Addition less Cancellation | Addition between and at the best Bid and Ask | Imbalance in Depth |
| 0-2 | 0.18 | $-0.0425^{ns}$ (0.0373) | $-0.1120$ (0.0460) | $0.2322$ (0.1126) | $-0.0878^{ns}$ (0.0673) |
| 3 | 0.19 | $-0.0854$ (0.0430) | $-0.0668$ (0.0258) | $0.1050^{ns}$ (0.0707) | $-0.0923$ (0.0404) |
| 4 | 0.19 | $-0.3023$ (0.0449) | $-0.0719$ (0.0194) | $0.1584$ (0.0476) | $-0.1864$ (0.0306) |
| 5 | 0.20 | $-0.2860$ (0.0590) | $-0.1125$ (0.0160) | $0.0274$ (0.0516) | $-0.0172^{ns}$ (0.0254) |
| 6 | 0.20 | $-0.3757$ (0.0502) | $-0.0894$ (0.0104) | $0.1501$ (0.0323) | $-0.0791$ (0.0107) |
| 7 | 0.20 | $-0.2443$ (0.0571) | $-0.0931$ (0.0108) | $0.1194$ (0.0352) | $-0.0964$ (0.0187) |
| 8 | 0.23 | $-0.6894$ (0.0569) | $-0.1184$ (0.00781) | $0.2262$ (0.0258) | $-0.0266$ (0.0130) |
| 9-10 | 0.19 | $-0.7267$ (0.0589) | $-0.0963$ (0.00444) | $0.1192$ (0.0141) | $-0.0334$ (0.0335) |

The numbers in parentheses are the standard errors for the parameters. The coefficient values with the superscript ns indicate that these numbers are not significant at the 95% confidence level.

All variables were standardized by their corresponding historical 3 months means and standard deviations, i.e.

$$X_{(standard)} = \frac{x - \bar{x}}{\sigma(x)}$$

where $\bar{x}$ is the mean and $\sigma(x)$ is the standard deviation of x.

The variable "Return in last 15-second" is the time weighted percentage mid-quote return within the previous 15 seconds prior to execution.

Figure 4:
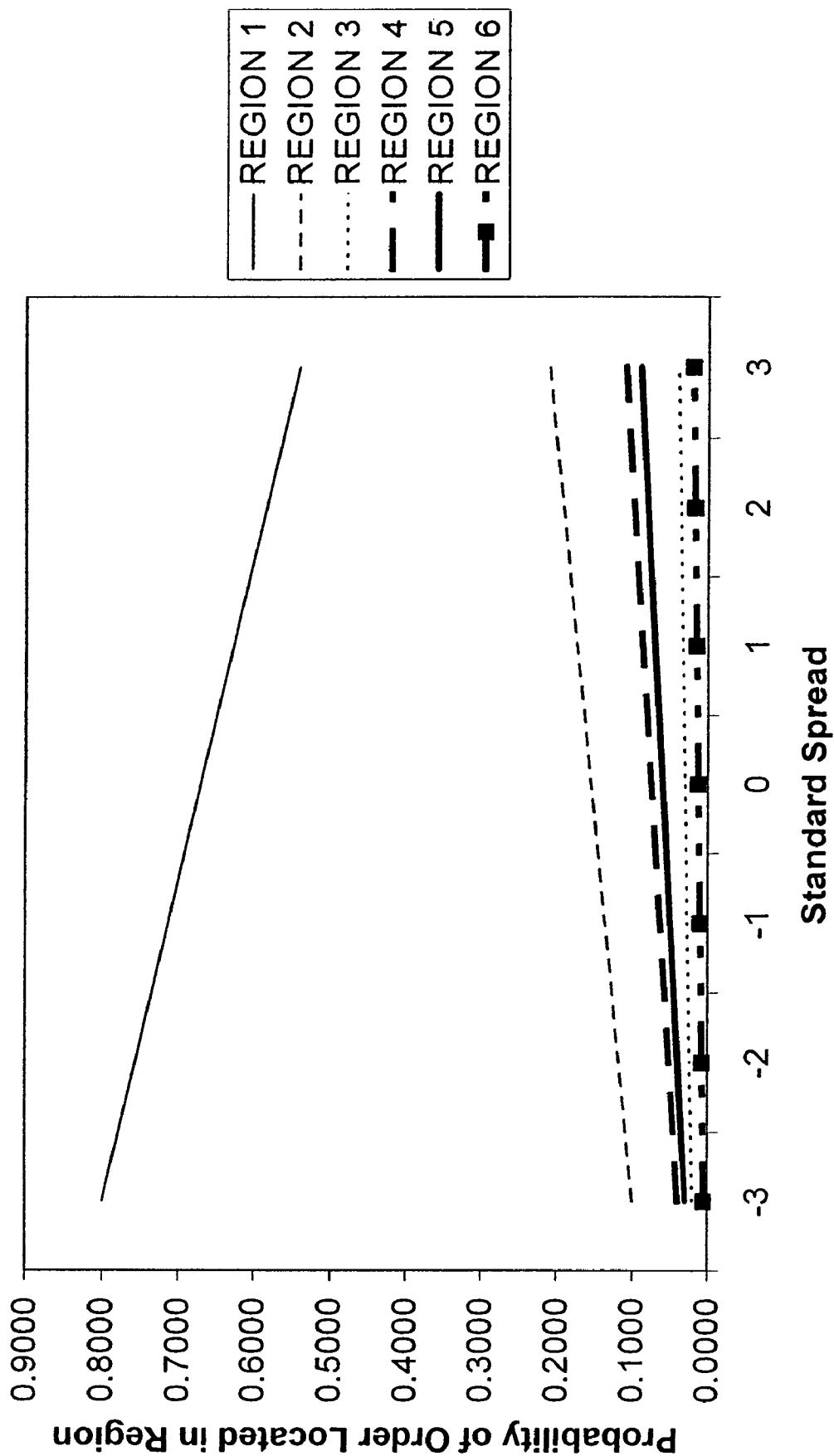
FIG. 4 is a graph depicting the probability that an undisclosed sell limit order is with a particular region of the bid-ask spread.

If stocks in Liquidity Group 8 are examined and the bid-ask spread is divided into six equally sized groups, then FIG. 4 illustrates how placement of hidden volume changes with the spread where region 1 includes the best ask price and region 6 includes the region prior to best bid price. As spread increases beyond its normal levels, hidden volume is more likely to be redistributed within the spread. This pattern holds true across all liquidity groups.

Figure 9:
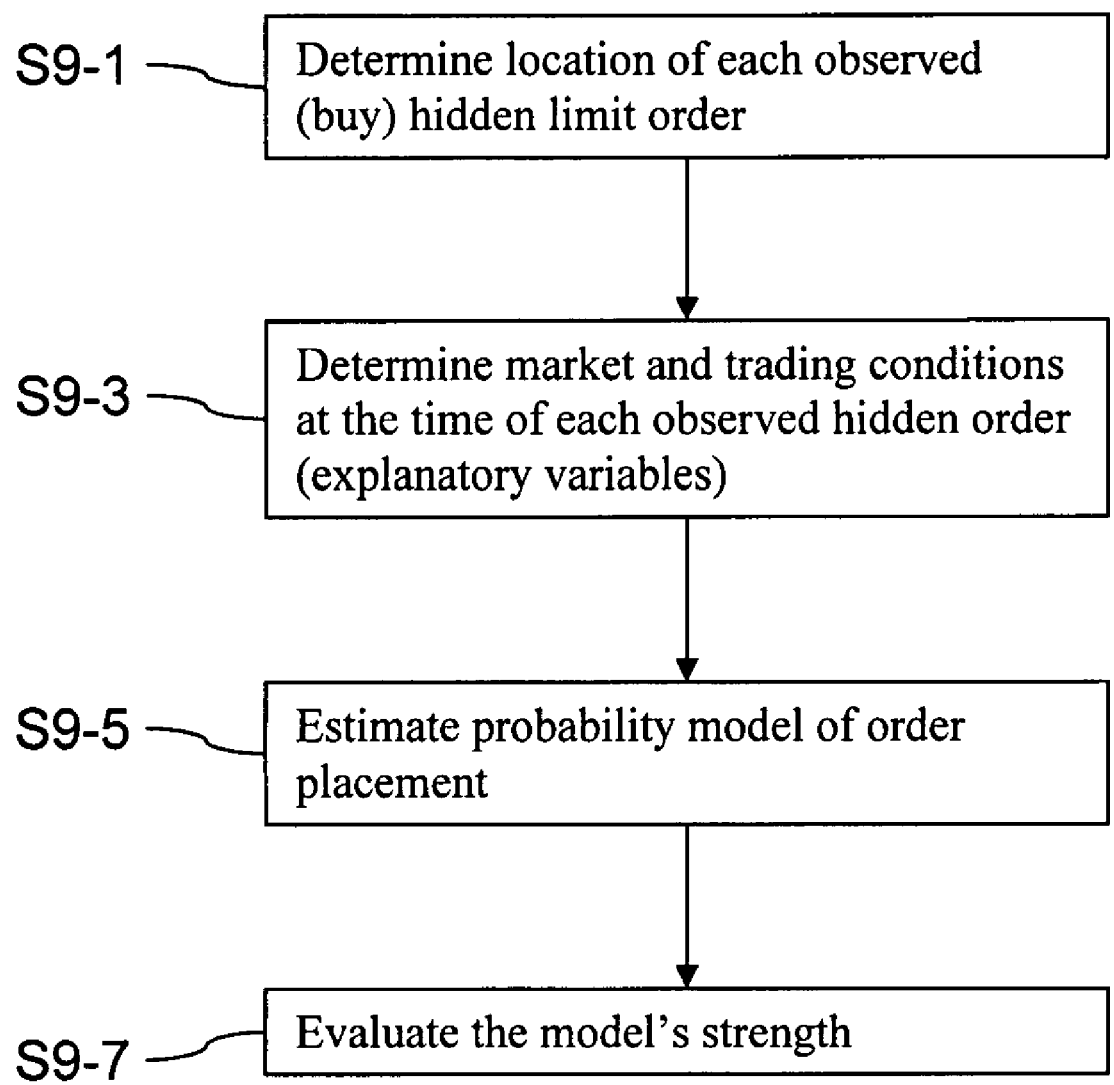
FIG. 9 is a flow chart depicting a method to develop and evaluate a model of hidden order placement according to an embodiment of the present invention.

Thus, according to embodiments of the invention, a method of creating a hidden order location model, referring to FIG. 9, may include steps of determining the location of each observed (buy) hidden limit order S9-1, i.e., Region 1={bid}
Region 2=(bid, bid+0.2·(ask−bid)]
Region 3=(bid+0.2·(ask−bid), bid+0.4·(ask−bid)]
Region 4=(bid+0.4·(ask·bid), bid+0.6·(ask−bid)]
Region 5=(bid+0.6·(ask·bid), bid+0.8·(ask−bid)]
Region 6=(bid+0.8·(ask−bid), ask);

determining market and trading conditions at the time of each observed hidden order (explanatory variables) S9-3; estimating probability model of order placement S9-5; and evaluating the model's strength S9-7. The step of evaluating the model's strength may include examining the prior belief and matching it with the empirical results to see if the results are consistent across liquidity groups and determining $R^2$ for assessing the goodness of fit.

When considering certain stylized facts apart from others, certain conclusions may be drawn. For example, if only considering increasing mid-quote volatility, it is expected that an investor is more willing to place hidden limit orders within the spread. Also, market participants will place more hidden volume inside the spread since no information or strategy is revealed to the market. If only considering increasing intra-day (standardized) spread, an investor is more willing to redistribute hidden order placement within the spread. Also, when considering only limit order placement, if more limit orders are being placed, more hidden order volume inside the spread is expected. Placing hidden limit orders inside the spread camouflages one's liquidity demand and thus protects against other market participants who might step ahead.

C. Model Development

Figure 12:
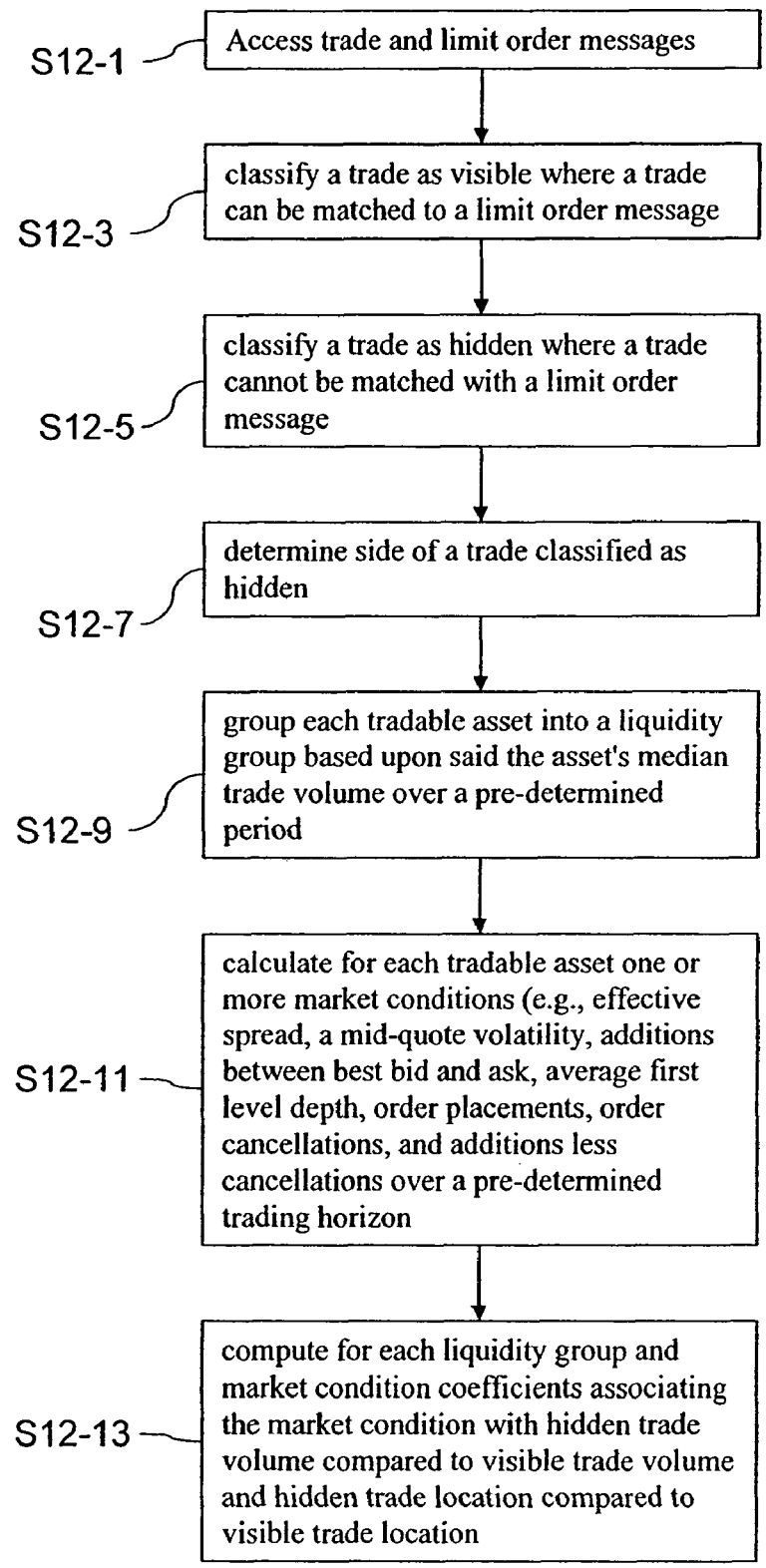
FIG. 12 is a flow chart depicting a method to develop a model for inferring hidden orders according to an embodiment of the present invention.

With reference to FIG. 12, a flow chart of a method for creating a model for calculating the probability, volume, and/or placement of a hidden orders is shown, according to an embodiment of the present invention. Processing begins at step S12-1, wherein real-time trading messages can be obtained or received as already discussed above in the "Data" section. From the order data, a trade may be classified as visible where the trade can be matched to a limit order message in step S12-3 while a trade which cannot be matched with a limit order message is classified as hidden in step S12-5. The side of a trade classified as hidden is determined in step S12-7. Trade classification and side determination are discussed above in the "Data" section.

In step S12-9, tradable assets can be grouped into liquidity groups based upon the median trade volume of the asset during a pre-determined liquidity period. A liquidity period may be, for example, the 21-day period coinciding with the first 21 days of the real-time trading messages.

In step S12-11, one or more market conditions can be calculated for each tradable asset over a pre-determined trading horizon. Market conditions may include, for example, effective spread, mid-quote volatility, additions between best bid and ask, average first level depth, order placements, order cancellations, and additions less cancellations. The trading horizon may be, for example, 1-, 2-, 3-, 4-, or 5-seconds or instantaneous.

In step S12-13, a coefficient is calculated for each liquidity group and each market condition, which associates the market condition with hidden trade volume compared to visible trade volume and hidden trade location compared to visible trade location. The coefficients can be stored in a table of coefficients, such as in a database or other memory device. The table of coefficients, as already described above, can be utilized as a model for estimating current hidden liquidity in a trade forum based upon current market conditions.

Thus, a coefficient can be used to quantize the degree to which one or more market conditions can relate to hidden order volume and or location for tradable assets. Coefficients may also be associated with liquidity groups, as described above. The model (e.g., coefficients) can then be applied to real-time data to estimate hidden liquidity.

Testing Model.

To examine the strength of the model in predicting the hidden volume and its placement on the order book, all (partial) executions that have the same sign (buy or sell) and occur around the same time on ARCA were aggregated. For each of these trade clusters, the existing market conditions were identified and saved and the cluster volume, the share-weighted average execution price, and the average execution price that is derived from the observed unadjusted limit order book at the start of the cluster execution were calculated.

The difference between the limit order book's perceived execution price $v_i$ and the actual execution price $p_i$ is referred to as the Virtual Price Error $v_i-p_i$. Virtual Price Errors are typically positive and give a first impression about the usability of the displayed limit order book alone.

Next, the limit order book can be reconstructed based on the prevailing market conditions using the models that have been discussed in subsections A and B above, and the estimated undisclosed limit order volume at the appropriate price levels is included. Based on the adjusted limit order book, the estimated execution price $v_i^{new}$ and the New Virtual Price Error $v_i^{new}-p_i$ can be determined.

The above procedure enables: a) having a one-to-one comparison between actual and estimated prices, and b) evaluating the superiority of the adjusted limit order book over the unadjusted limit order book. To assess accuracy, varying scenarios can be studied for each liquidity group, considering different Time Of Day and different levels of Volatility, Spread, or Limit Order Volume Activity. More precisely, for each liquidity group and scenario, the average Virtual Price Error and average New Virtual Price Errors can be computed for all subgroups of each scenario.

Figure 5:
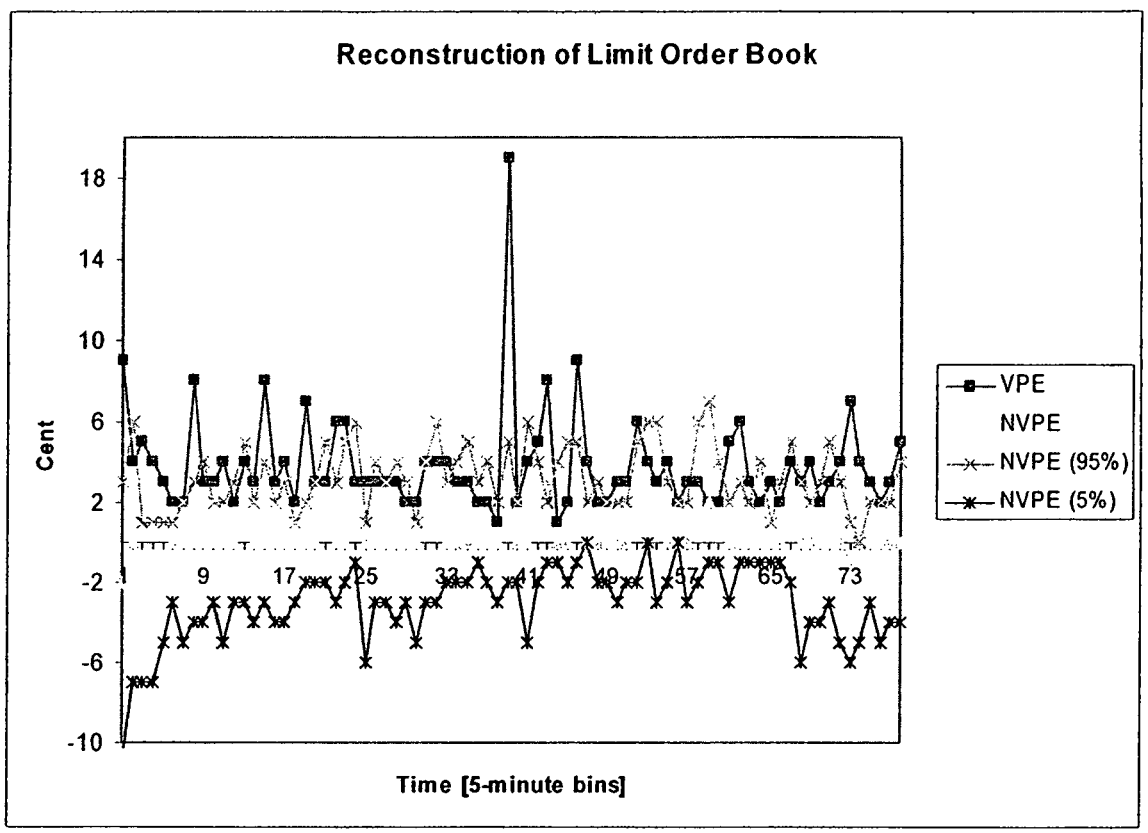
FIG. 5 is a graph depicting a reconstructed limit order book.

FIG. 5 shows the graphical comparison between the average Virtual Price Error and average New Virtual Price Error for all stocks that have been classified in Liquidity Group 2. The trading day can be broken-up into seventy-eight 5-minute bins and the average Virtual Price Error and average New Virtual Price Error in each of these subgroups are presented. So as to capture the Virtual Price Error distribution, the 5% and 95% levels can also be graphed. On average, there is an error of approximately 5-cents difference between what a trader would believe to be the instantaneous trade execution price if he only looks at the displayed limit order book, and the actual execution price. That disparity is eliminated when the model is used to adjust for the hidden volume. Similar results hold for all other examined scenarios which, for brevity, are omitted here.

Figure 10:
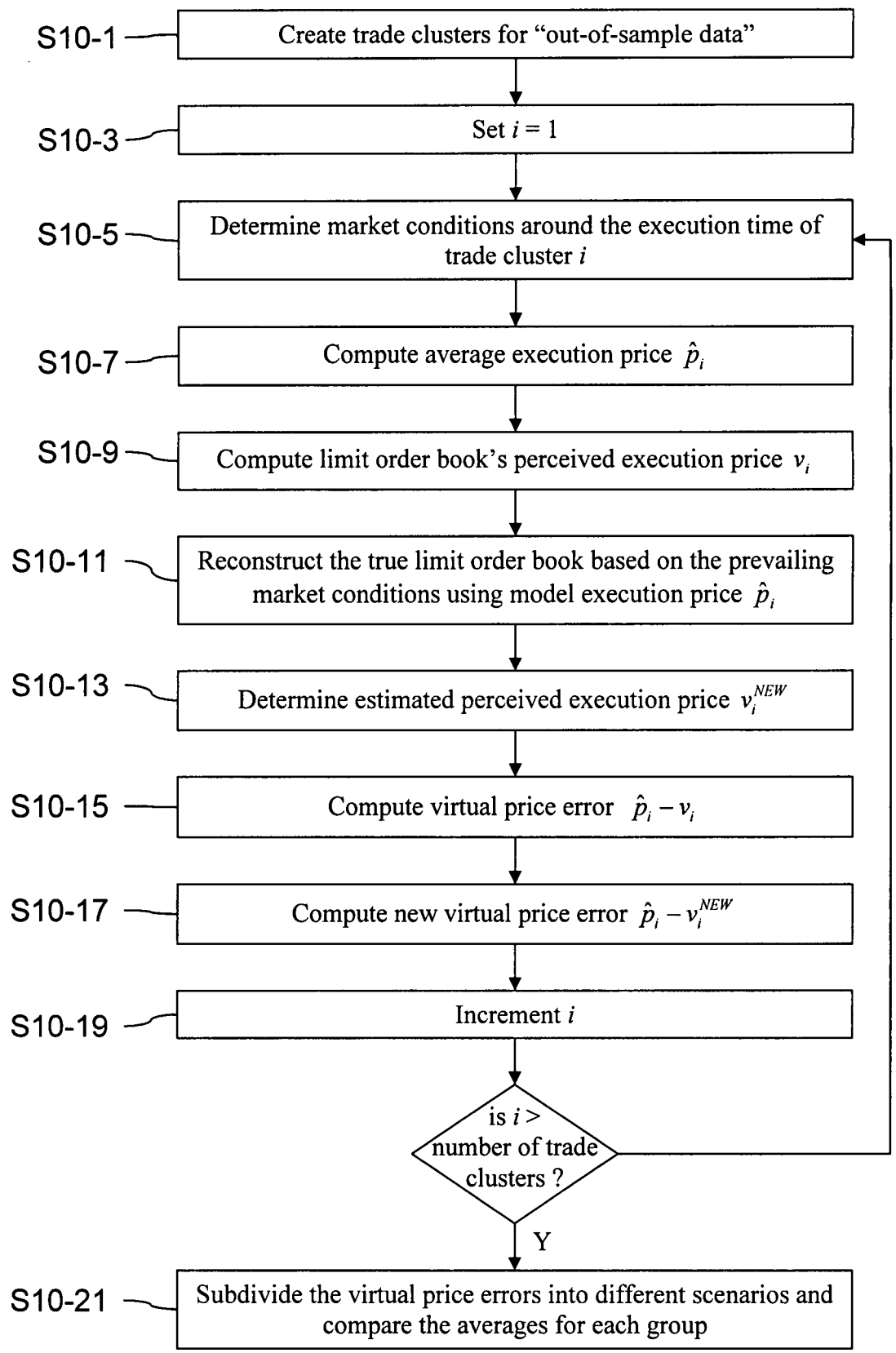
FIG. 10 is a flow chart depicting a method to evaluate a model for inferring hidden orders according to an embodiment of the present invention.

As shown in FIG. 10, the performance of a model may be evaluated by using virtual price error computations. Steps in a method of evaluating a model include creating trade clusters for "out of sample data" S10-1, where a trade cluster is an accumulation of (partial) executions within a short timeframe (e.g. one month) on the same side. Virtual prices will be computed by reference to an index i, where i indexes the trade cluster. The index i is set to 1 in step S10-3. Next, the market conditions around the execution time of trade cluster i are determined in step S10-5 and the average execution price of that trade cluster is computed in step S10-7. In step S10-9, the limit order book's perceived execution price is computed and in step S10-11, the "true" limit order, book based on the market conditions, is reconstructed using the model's execution price. Then, the virtual price error and new virtual price error are computed in steps S10-15 and S10-17. The index i is incremented in step S10-19 and subsequently compared to the number of trade clusters to determine whether additional virtual price errors must be computed. In step S10-21, the virtual price errors may be subdivided into different scenarios and the averages compared for each group.

Scenarios may be subdivided by time of day, volatility, spread, limit order volume activity and other factors. The method of FIG. 10 permits a one-to-one comparison between actual and estimated execution prices and evaluation of the superiority of the adjusted limit order book over the unadjusted limit order book.

Applications.

In this section, the practical importance of the model of the present invention is described and illustrated. A static example associated with placing a market order is created examine both the cost and price impact associated with executing the order instantaneously and within a 2- and 5-minute bin period are examined. The price impact $PI_i$ of a market order i is defined as the difference between the last execution price $p_i^{final}$ and the mid-quote $m_i$ immediately prior to the market order i. Similarly, the cost $C_i$ of a market order i is defined as the difference between the share-weighted average execution price $\bar{p}_i$ and the mid-quote $m_i$ immediately prior to the market order i. More precisely, $$PI_i=\delta_i \cdot (p_i^{final}-m_i) \text{ and } C_i=\delta_i \cdot (\bar{p}_i-m_i),$$

where $\delta_i=1$ for a buy market order and $\delta_i=-1$ otherwise.

FIG. 1 illustrates that executing a buy market order of 1,000 shares of the company, Argonaut Group Inc. would have a price impact of $0.10 and the cost per share would be $0.05. For illustration purposes, it is assumed that at 10:40 am, Argonaut Group Inc. is very actively traded with an effective spread of one deviation less than average and volatility being one half of a deviation higher than normal. Moreover, it is assumed that in the previous 5-minute bin, of the 1,000 shares traded, 30% are classified as being hidden shares. From the specified market conditions, it is estimated that there will be around 60 hidden shares instantaneously available between the best bid and ask and 147 and 280 hidden shares of sell limit orders within the next 2 and 5 minutes, respectively. Table 4 gives the complete breakdown.

TABLE 4

| PRICE | INSTAN-TANEOUS | 2-MINUTES | 5-MINUTES | PROBABIL-ITY |
|---|---|---|---|---|
| $35.00 | 3 | 7 | 13 | 0.046319 |
| $35.01 | 2 | 4 | 8 | 0.027683 |
| $35.02 | 5 | 12 | 23 | 0.080532 |
| $35.03 | 6 | 15 | 29 | 0.105157 |
| $35.05 | 43 | 109 | 207 | 0.740309 |

Given the existing trading conditions for Argonaut Group Inc. at 10:40 am, Table 4 presents the amount of hidden sell limit order volume and its location for different execution horizons. The estimated hidden volume is expected to be available for a market order being executed instantaneously, within 2, or 5 minutes. If there is hidden volume, column "PROBABILITY" shows the likelihood that hidden volume is located at that price.

Next, the location of the estimated hidden sell limit order volume can be estimated. That is, the price level at which one could expect the undisclosed sell limit orders. Using the probability model discussed above subsection B of the "Model" section, the probability associated with each price level between the best bid and ask is estimated.

Given the market conditions for Argonaut Group Inc. at 10:40 am, Table 4 shows that there is approximately 4.6% of hidden sell limit order volume located at the price level $35.00 and that 15.45% of total hidden sell limit order volume is available at or below $35.02. As for the best ask price ($35.05), there is approximately 74% of the total hidden sell limit order volume located at that level. If the limit order book is reconstructed to include the hidden volume (the probabilities are multiplied by the total hidden sell limit order volume), the price per share traded for the instantaneous trade model (with the assumption of locating 59 shares) is $35.065 and the cost is $0.045, which is lower than the estimated cost for the unadjusted book. The price impact remains as $0.10.

Figure 6:
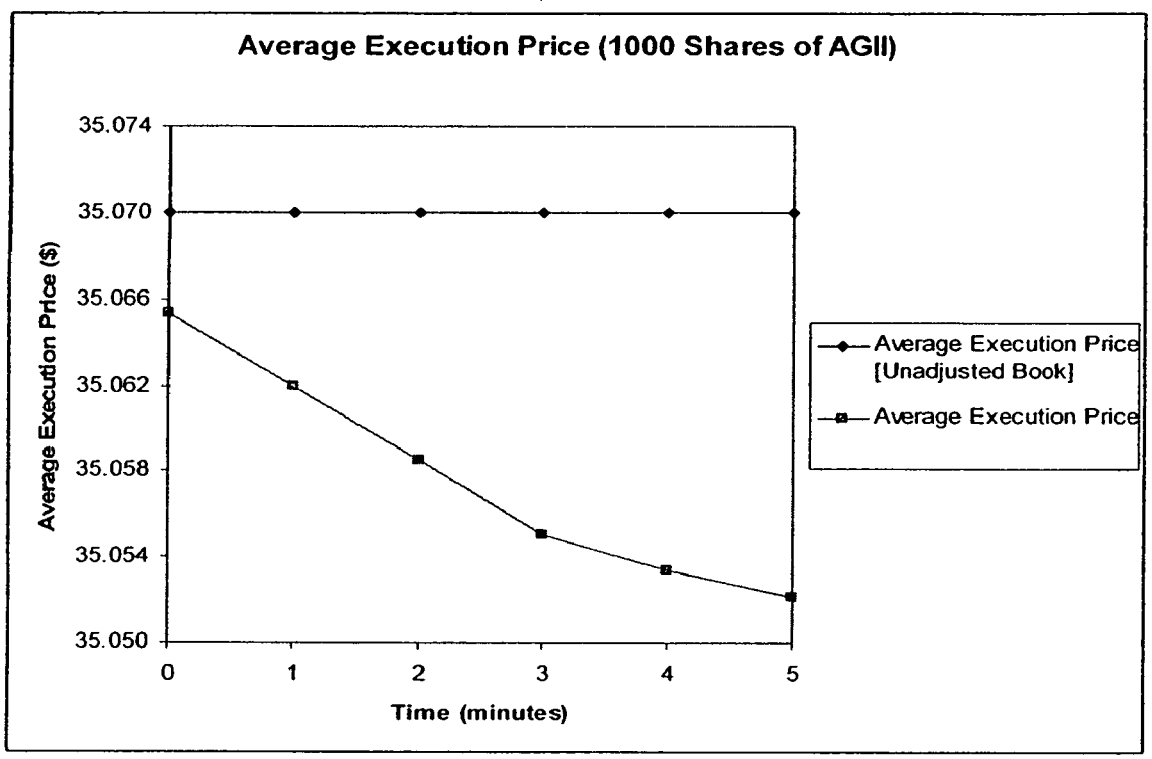
FIG. 6 is a graph depicting an average execution price as a function of time.

FIG. 6 is a graphical representation of trading horizon, hidden sell limit order volume, and average execution price. FIG. 6 shows the average execution price based on the unadjusted (static) limit order book in comparison to the adjusted book that takes into account trading instantaneously and with 1-, 2-, 3-, 4-, and 5-minute horizon. As trading horizon increases and the market players execute against the estimated volume within the next 5 minutes, the average expected execution price falls to $35.052 and the expected price impact decreases to $0.05.

While market venues strive to achieve greater transparency by offering market data products with more granular and current information, market participants, in their demand for minimal information leakage, continue to hide their trading intent by placing hidden limit orders. This conflict between market transparency and traders' secrecy complicates the tasks of algorithmic trading systems of seeking out both liquidity and best execution, and complicates the tasks of the market participant by obscuring the true liquidity of the market.

The rising popularity of placing undisclosed limit orders instead of displayed limit orders, has greatly limited the usefulness of the limit order book when it comes to transparency of market participants' actions. It has been shown that using a "simple" limit order book is insufficient for estimating true liquidity and transaction costs. Furthermore, utilizing an analysis of the "simple" limit order book and ignoring the undisclosed limit order volume actually alter the execution optimization and transaction and opportunity cost reduction, with a bias towards lower available liquidity and higher transaction costs.

However, it can easily be inferred from the results that ignoring the probability of undisclosed volume within the spread greatly limits (at best) the ability of algorithmic trading systems and smart order routing systems to find the best execution price for market orders. Algorithmic trading systems must either uniformly search across different market venues (at a great opportunity cost) or devise smarter ways to seek out available liquidity. So-called 'smart' order routing systems that do not take into account the probability of undisclosed volume within the spread aren't smart.

The present invention provides market participants systems and methods for monitoring the limit order book for liquidity. The Effective Spread is negatively correlated to the hidden liquidity and the Mid-Quote Volatility, Additions Between Best Bid And Ask, and the Additions Less Cancellations are all positively correlated to hidden volume. Although these facts do not permit a reconstruction of the "real" book, they are nonetheless useful in getting at least a sense of the overall hidden liquidity, if not also its size and location.

The present invention is not limited to the foregoing disclosure and stylized facts. It can be used to enhance the existing picture of the limit order book by synthesizing the "real" limit order book based on the probability of hidden volume, including its location (in the book), size, and venue. The major implications of utilizing this extra information are twofold and apply both to automated trading systems and market participants' strategies.

For example, in algorithmic trading systems and smart routing systems it would be obvious that given equal price and liquidity across multiple venues, the best choice of which venue to route to would be the one with the highest probability of undisclosed volume within the spread; such systems would be considered to be "smart". For market participants this enhanced book information can be used to guide a liquidity trader to the best sources of liquidity and could potentially be used to drive enhanced limit order trading models. By utilizing this enhanced book in choosing to place a limit order, and in selecting its price, size, time, venue, and whether or not it should be displayed, the market participant has a more realistic view of how others will respond to his action.

Figure 8:
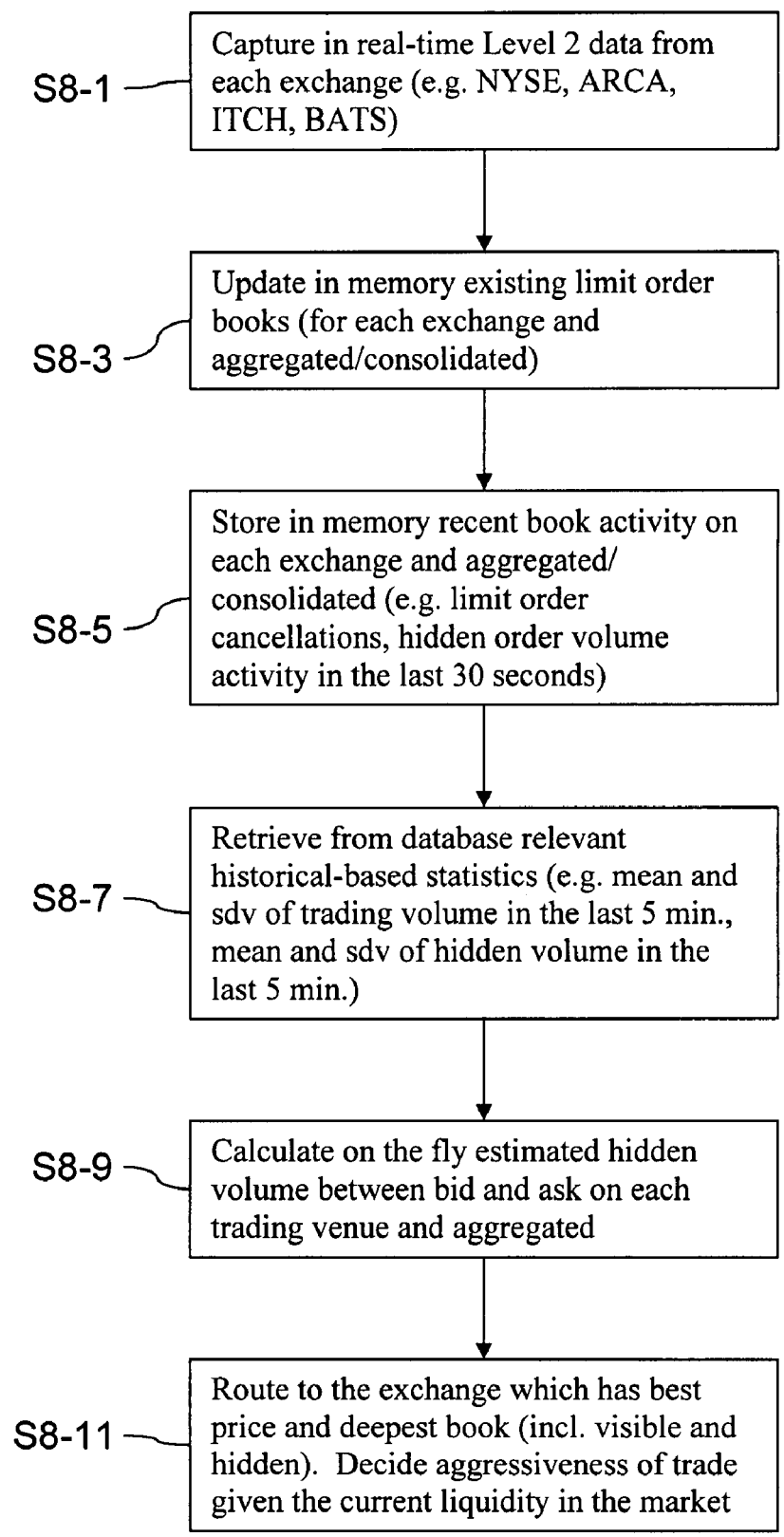
FIG. 8 is a flow chart depicting a method in accordance with an embodiment of the invention.

In accordance with method of estimating hidden volume embodying an aspect of the invention, and with reference to FIG. 8, there are the following steps: Data are captured in real-time using Level 2 data from each exchange (e.g. NYSE, ARCA, ITCH, BATS) in step S8-1. Then, existing limit order books are updated in memory (for each exchange and aggregated/consolidated) in step S8-3. Recent book activity on each exchange is stored in memory and aggregated/consolidated (for example, limit order cancellations, hidden order volume activity in the last 30 seconds) in step S8-5. Relevant historical-based statistics are retrieved from the MD database (for example, mean and standard deviation of trading volume and hidden volume in the last 5 minutes) in step S8-7. The estimated hidden volume is calculated on the fly between bid and ask on each trading venue and aggregated in step S8-9. Determinations of which exchange which has best price and deepest book (including visible and hidden) and the aggressiveness of trade given the current liquidity in the market are made in step S8-11.

Figure 7:
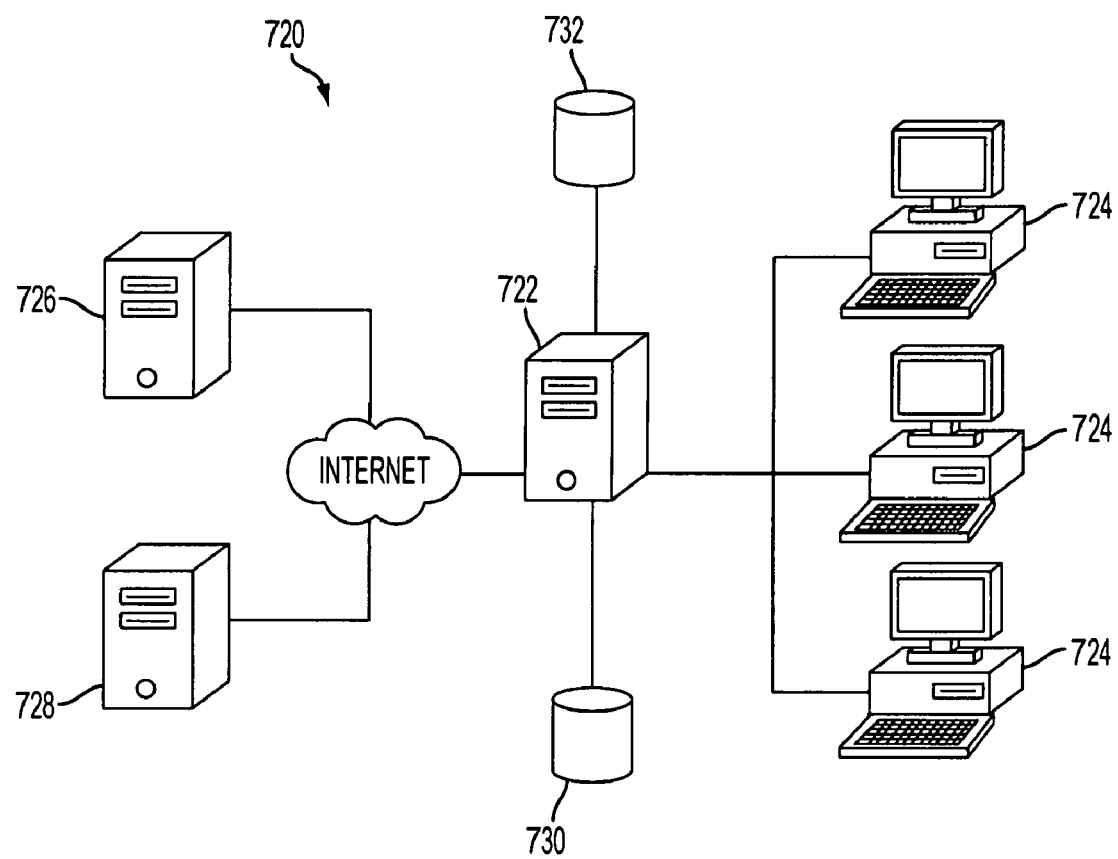
FIG. 7 is a logical schematic diagram for a computer system that can implement features of the present invention.

Referring now to FIG. 7, a schematic diagram of an exemplary system 720 that can be configured to perform aspects of the present invention described above, such as, but not limited to, processes for estimating the probability of hidden market orders according to an embodiment of the present invention is shown. The system 720 can include a server 722 in communication with one or more user workstations 724, for example via a direct data link connection or a network such as a local area network (LAN), an intranet, or internet. The server 722 and the work stations 724 can be computers of any type so long as they are capable of performing their respective functions as described herein. The computers can be the same, or different from one another, but preferably each have at least one processor and at least one memory device capable of storing a set of machine readable instructions (i.e., computer software) executable by at least one processor to perform the desired functions, where by "memory device" is meant any type of media or device for storing information in a digital format on a permanent or temporary basis such as, for example, a magnetic hard disk, flash memory, an optical disk, random access memory (RAM), etc.

Computer software stored on the server ("server software"), when executed by the server's processor, causes the server 722 to communicate with the workstations 24 and one or more sources 726 of financial data, such as data vendors, that offer real-time securities data in an electronic format. The server software, when executed by the server's processor, also causes the server 722 to perform certain calculations, described in greater detail below, using the real-time data from the data vendors 726, as well as estimating the probability of hidden market orders, and providing estimated order book data for display on one or more workstations 724.

The computer software stored on a workstation ("user software"), when executed by the workstation processor, causes the workstation 724 to receive estimated order book data from the server 722 and to display the estimated order book data to a user on a monitor. Real-time and historical securities data used by the system 720 to estimate an order book can be received from a remote source 720, such as a data vendor, or from a local database 730 connected to, or maintained on, the server 722.

The server 722 can be located at a user's facility or at a site remote from the user's facility. Communication between the server 722 and the data vendors 726 and 728 can be accomplished via a direct data link connection or a network, such as a LAN, an intranet, or internet. In alternate embodiments, one or more workstations can be configured to perform the server functions such that a dedicated server is not needed. It will also be appreciated that workstations can be configured to communicate individually with data vendors and/or local databases without being networked to a server or other workstations.

A number of embodiments of the present invention have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention. For example, as explained above, numerous other analytics could be calculated for the purpose of generating indicators of abnormal trading conditions for a security according to the present invention.

We claim:

1. A computer-implemented method for constructing an order book from displayed market data for a tradable asset, said method comprising steps of:
   at a computer, measuring an effective spread of the tradable asset from displayed market data;
   at a computer, measuring a mid-quote volatility of the tradable asset from displayed market data;
   at a computer, measuring additions between best bid and ask of the tradable asset from displayed market data;
   at a computer, measuring additions less cancellations of the tradable asset from displayed market data;
   at a computer, calculating a probability of a hidden order for the tradable asset as a function of the measured effective spread, the mid-quote volatility, additions between best bid and ask, and additions less cancellations;
   calculating a hidden order volume between the best bid and ask;
   calculating a hidden order price; and
   at a computer, constructing an order book for the tradable asset that includes displayed order volume and hidden order volume based on the results of said calculating steps.

2. The method in accordance with claim 1 wherein the probability of a hidden order is also a function of the time of day.

3. The method in accordance with claim 1 wherein the probability of a hidden order is also a function of the time of day.

4. A computer-readable medium storing computer-executable instructions for constructing an order book for a tradable asset, by performing operations comprising:
   measuring an effective spread of the tradable asset from displayed market data;
   measuring a mid-quote volatility of the tradable asset from displayed market data;
   measuring additions between best bid and ask of the tradable asset from displayed market data;
   measuring additions less cancellations of the tradable asset from displayed market data;
   calculating a probability of a hidden order for the tradable asset as a function of the measured effective spread, the mid-quote volatility, additions between best bid and ask, and additions less cancellations;
   calculating a hidden order volume between the best bid and ask;
   calculating a hidden order price; and
   constructing an order book for the tradable asset that includes displayed order volume and hidden order volume based on the results of said calculating steps.

5. A computer-implemented method for creating a model for calculating a probability and a characteristic of a hidden order for a tradable asset, said method comprising the steps of:
   at a computer, accessing a plurality of electronic, level-2 trading messages from a trading forum for a predefined period of time, each message including information about one or more orders for tradable assets or executed trades for tradable assets, said order information including identification of a tradable asset, a price, and a quantity;
   at a computer, identifying executed trades from said messages;
   at a computer, classifying a trade from the identified trades as displayed if the trade can be matched to orders in said messages;
   at a computer, classifying a trade as hidden where said trade cannot be matched to orders in said messages;
   at a computer, determining a side of each order corresponding to a trade classified as hidden;

at a computer, calculating a hidden trade volume and a hidden trade location for tradable assets based upon said classifying steps and said determining step;

at a computer, grouping each tradable asset in the plurality of tradable assets into one of a plurality of liquidity groups based upon said each tradable asset's median trade volume over a pre-determined liquidity period;

at a computer, calculating for each tradable asset in the plurality of tradable assets at least one market condition; and at a computer, calculating for a liquidity group a coefficient associating the at least one market condition with at least one of said hidden trade volume and said hidden trade location.

6. The method according to claim 5 wherein the pre-determined liquidity period is a 21-day period coinciding with a first 21-days of the plurality of trading messages.

7. The method according to claim 5, wherein the market condition comprises at least one of the an effective spread, a mid-quote volatility, additions between best bid and ask, average first level depth, order placements, order cancellations, and additions less cancellations over a pre-determined trading horizon.

8. The method according to claim 5 wherein the number of liquidity groups is 11.

9. The method of claim 5 wherein the real-time trading messages are obtained from ARCA Comstock L1 and L2 feeds.

10. The method of claim 5 wherein the trading messages are obtained from a direct exchange L2 feed.

11. The method of claim 5 wherein at least one coefficient x is standardized as $X_{(standard)}$ by its corresponding mean and standard deviation over a pre-determined prior standardization period.

12. The method of claim 11 wherein the pre-determined prior standardization period is the prior three months.

13. The method of claim 12, wherein the standardized coefficient $X_{(standard)}$ is computed using the formula $$X_{(standard)} = \frac{x - \bar{x}}{\sigma(x)}$$

where $\bar{x}$ is the mean over the pre-determined prior standardization period and $\sigma(x)$ is the standard deviation of x over the pre-determined prior standardization period.

14. The method of claim 5 further comprising a step of estimating a McFadden's LRI to approximate a pseudo $R^2$ for assessing the goodness of fit of a coefficient.

* * * * *